US012654130B2

(12) United States Patent　　　(10) Patent No.:　US 12,654,130 B2
Southwell et al.　　　　　　　　　(45) Date of Patent:　　Jun. 16, 2026

(54) USE OF SILICA NANOPARTICLES WITH GLYOXAL FOR H2S SCAVENGING

(71) Applicant: NISSAN CHEMICAL AMERICA CORPORATION, Houston, TX (US)

(72) Inventors: John Edmond Southwell, Glen Ellyn, IL (US); Samuel James Maguire-Boyle, Spring, TX (US)

(73) Assignee: Nissan Chemical America Corporation, Houston, TX (US)

( * ) Notice: Subject to any disclaimer, the term of this patent is extended or adjusted under 35 U.S.C. 154(b) by 468 days.

(21) Appl. No.: 18/546,674

(22) PCT Filed: Feb. 18, 2022

(86) PCT No.: PCT/US2022/016973

§ 371 (c)(1),
(2) Date: Aug. 16, 2023

(87) PCT Pub. No.: WO2022/178251

PCT Pub. Date: Aug. 25, 2022

(65) Prior Publication Data

US 2024/0042382 A1　　Feb. 8, 2024

Related U.S. Application Data

(60) Provisional application No. 63/151,243, filed on Feb. 19, 2021.

(51) Int. Cl.
| | |
|---|---|
| *B01D 53/00* | (2006.01) |
| *B01D 53/52* | (2006.01) |
| *B01D 53/80* | (2006.01) |
| *C10G 25/05* | (2006.01) |
| *C10G 29/24* | (2006.01) |

(52) U.S. Cl.
CPC ............ *B01D 53/52* (2013.01); *B01D 53/80* (2013.01); *C10G 25/05* (2013.01); *C10G 29/24* (2013.01); *B01D 2251/21* (2013.01); *B01D 2252/205* (2013.01); *B01D 2253/104* (2013.01); *B01D 2253/106* (2013.01)

(58) Field of Classification Search
None
See application file for complete search history.

(56) References Cited

U.S. PATENT DOCUMENTS

| | | | |
|---|---|---|---|
| 1,991,765 | A | 2/1935 | Marks |
| 2,606,873 | A | 8/1952 | Cardwell et al. |
| 3,514,410 | A | 5/1970 | Engle et al. |
| 3,585,069 | A | 6/1971 | Owsley |
| 3,669,613 | A | 6/1972 | Knox et al. |
| 4,220,500 | A | 9/1980 | Baba et al. |
| 4,289,639 | A | 9/1981 | Buske |
| 4,310,435 | A | 1/1982 | Frenier |
| 4,680,127 | A | 7/1987 | Edmondson |
| 4,808,765 | A | 2/1989 | Pearce et al. |
| 4,978,512 | A | 12/1990 | Dillon et al. |
| 5,085,842 | A | 2/1992 | Porz et al. |
| 5,208,369 | A | 5/1993 | Crump et al. |
| 5,347,004 | A * | 9/1994 | Rivers ................... B01D 53/52 544/216 |
| 5,980,845 | A | 11/1999 | Cherry |
| 7,141,518 | B2 | 11/2006 | Macdonald et al. |
| 7,438,875 | B2 | 10/2008 | Do et al. |
| 7,985,881 | B2 | 7/2011 | Westlund et al. |
| 9,006,508 | B2 | 4/2015 | Kanazirev et al. |
| 9,463,989 | B2 | 10/2016 | Menendez et al. |
| 11,059,079 | B1 | 7/2021 | Allred, Jr. |
| 11,077,474 | B1 | 8/2021 | Allred, Jr. |
| 11,512,241 | B2 | 11/2022 | Allred, Jr. |
| 11,732,181 | B2 | 8/2023 | Allred, Jr. |
| 12,275,891 | B2 | 4/2025 | Allred, Jr. |
| 2005/0084438 | A1 | 4/2005 | Do et al. |
| 2005/0084474 | A1* | 4/2005 | Wu .......................... A61L 9/014 424/76.1 |
| 2005/0085144 | A1 | 4/2005 | Macdonald et al. |
| 2008/0099375 | A1* | 5/2008 | Landau ................... B01J 20/20 208/244 |
| 2009/0065445 | A1 | 3/2009 | Westlund et al. |
| 2011/0000854 | A1 | 1/2011 | Nichols et al. |
| 2013/0004393 | A1 | 1/2013 | Menendez et al. |
| 2013/0204065 | A1 | 8/2013 | Kanazirev et al. |
| 2014/0155669 | A1 | 6/2014 | Slowing et al. |
| 2016/0237335 | A1 | 8/2016 | Salla et al. |
| 2018/0044598 | A1 | 2/2018 | Tan |
| 2018/0291284 | A1 | 10/2018 | Sommese et al. |
| 2018/0345212 | A1 | 12/2018 | Legaspi Felipe et al. |
| 2021/0322920 | A1 | 10/2021 | Sahoo et al. |
| 2025/0243399 | A1 | 7/2025 | Allred, Jr. |

FOREIGN PATENT DOCUMENTS

| | | |
|---|---|---|
| CA | 2769060 A1 | 8/2013 |
| CN | 101591555 B | 7/2012 |
| CN | 102585952 A | 7/2012 |
| CN | 106795752 B | 8/2020 |
| EP | 3566762 A2 | 11/2019 |
| WO | 9408980 A1 | 4/1994 |
| WO | 2016019101 | 2/2016 |
| WO | 2018009497 A1 | 1/2018 |
| WO | 2020039199 A1 | 2/2020 |
| WO | 2022178251 A1 | 8/2022 |
| WO | 12022178286 | 8/2022 |

OTHER PUBLICATIONS

Amit Singh et al., Copper Coated Silica Nanoparticles for Odor Removal, Sep. 26, 2010, 26(20), American Chemical Society, pp. 15837-15844.
Faeze Tari et al., Modified and Systematic Synthesis of Zinc Oxidesilica Composite Nanoparticles With Optimum Surface Area as a Proper H2S Sorbent, Apr. 1, 2017, vol. 95, No. 4, Canadian Journal of Chemical Engineering, 7 pages.
(Continued)

*Primary Examiner* — Stefanie J Cohen
(74) *Attorney, Agent, or Firm* — Nixon & Vanderhye, PC

(57) ABSTRACT

A process to remove $H_2S$ from a stream comprising the steps of adding a glyoxal, a silica nanoparticle composition, and optionally a triazine to the stream. The stream is selected from the group consisting of Oil streams, Gas streams, $CO_2$ point source purification streams and Geothermal Energy System streams.

7 Claims, No Drawings

(56) References Cited

OTHER PUBLICATIONS

Jan M. Bakke, et al. Hydrolysis of 1,3,5-Tris(2-hydroxyethyl)hexahydro-s-triazine and Its Reaction with H2S, Ind. Eng. Chem. Res., vol. 40, 2001, 3 pages.

Hydrogen Sulfide Scavenger (H2S Scavenger), Corrosionpedia, Last updated: Jul. 19, 2024, Retrieved from the Internet URL:https://www.corrosionpedia.com/definition/1645/hydrogen-sulfide-scavenger-h2s-scavenger.

L. Chu et al., Glycidoxypropyltrimethoxysilane Modified Colloidal Silica Coatings, MRS Proceedings, Jan. 1, 1996, 5 pages, vol. 435, XP055524536.

L. Hoven et al., Odour Management Guidance for Refineries, Jan. 1, 2020, pp. 1-93, XP055851362.

Michael Gonser, et al., Simultaneous Control of Subsurface Scale, Corrosion, and H2S Using a Single Capillary String: A Real-World Chemical Application in the Permian Basin, 2022 SPE Annual Technical Conference and Exhibition, Oct. 5, 2022, 20 pages.

Mohamed Chehimi et al., Surface chemical and thermodynamic properties of [gamma]-glycidoxy-propyltrimethoxysilane-treated alumina: an XPS and IGC study, Journal of Materials Chemistry, Jan. 1, 2001, pp. 533-543, vol. 11, No. 2.

Zeina Abbas et al., Evaluation of CO2 Purification Requirements and the Selection of Processes for Impurities Deep Removal from the CO2 Product Stream, Energy Procedia, 2013, pp. 2389-2396, vol. 37.

Schaack and Chan, $H_2S$ Scavenging: Caustic-based process remains attractive, Oil & Gas Journal, vol. 87, No. 5, pp. 81-82, Jan. 1989.

Schaack and Chan, $H_2S$ Scavenging: Cost estimating depends on location material, Oil & Gas Journal, vol. 87, No. 9, pp. 90-91, Feb. 1989.

Schaack and Chan, $H_2S$ Scavenging: Formaldehyde-methanol, metallic-oxide agents head scavengers list, Oil & Gas Journal, vol. 87, No. 4, pp. 51-55, Jan. 1989.

Schaack and Chan, $H_2S$ Scavenging: Process design guidelines vary widely, Oil & Gas Journal, vol. 87, No. 8, pp. 45-48, Feb. 1989.

International Search Report for PCT/US2022/016973 mailed May 25, 2022, 6 pages.

Written Opinion of the ISA for PCT/US2022/016973 mailed May 25, 2022, 5 pages.

U.S. Appl. No. 18/546,664, filed Aug. 16, 2023, Maguire-Boyle et al.

U.S. Appl. No. 18/546,662, filed Aug. 16, 2023, Coady et al.

U.S. Appl. No. 18/546,759, filed Aug. 16, 2023, Southwell et al.

U.S. Appl. No. 18/546,755, filed Aug. 16, 2023, Maguire-Boyle et al.

Vietnamese Office Action dated Jul. 4, 2025 in related Vietnamese Patent Application No. 1-2023-06322 and the response filed on May 22, 2025, 7 pages.

Indonesian Substantive Examination Report Stage I issued Sep. 25, 2025 in related Indonesian Patent Application No. P00202308837, 5 pages.

Portela et al., "Spectroscopic evaluation of commercial H2S scavengers", Fuel 216 (2018) 681-685.

Vietnamese Notice of Allowance dated Dec. 15, 2025 in related Vietnamese Patent Application No. 1-2023-06322 and the allowed claims, 3 pages.

Response filed on Nov. 18, 2025 to the Indonesian Substantive Examination Report Stage I in related Indonesian Patent Application No. P00202308837, 8 pages.

* cited by examiner

USE OF SILICA NANOPARTICLES WITH GLYOXAL FOR H2S SCAVENGING

CROSS-REFERENCE TO RELATED APPLICATIONS

This application is the U.S. national phase of International Application No. PCT/US2022/016973 filed Feb. 18, 2022, which designated the U.S. and claims priority to U.S. Provisional Patent Application No. 63/151,243 filed Feb. 19, 2021, the entire contents of each of which are hereby incorporated by reference.

FIELD OF THE INVENTION

This invention is in the field of chemicals used to remove hydrogen sulfide ($H_2S$) from Oil streams, Gas streams, $CO_2$ point source purification and Geothermal Energy Systems.

BACKGROUND OF THE INVENTION

Hydrogen sulfide is present in natural gas from many gas fields. It can also be present in Oil streams, Gas streams, $CO_2$ point source purification and Geothermal Energy Systems.

It is a highly undesirable constituent because it is toxic and corrosive and has a very foul odor. Therefore, several methods for its removal have been developed.

Glyoxal is a known H2S scavenger. If reduction of hydrogen sulfide to sulfur is not economical, for example because the hydrogen sulfide content in the recovered sulfur is lacking, so-called chemical scavenger systems are used. Three groups of chemicals are employed [Review "$H_2S$-Scavenging" in Oil and Gas Journal, January 1989, 51-55 (Part 1); 81-82 (Part 2); February 1989, 45-48 (Part 3); 90-91 (Part 4)]: Aldehydes, metal oxides and amines (U.S. Pat. No. 4,808,765).

The use of aldehydes for scavenging hydrogen sulfide has been known for a relatively long time. Thus, in U.S. Pat. No. 1,991,765, the reaction of hydrogen sulfide and an aldehyde between pH values of 2-12 at temperatures of 20-100° C. is described. In particular, at pH values of 2 or less the reaction of formaldehyde, glyoxal, acrolein and other aldehydes is repeatedly described (for example U.S. Pat. Nos. 2,606,873, 3,514,410, 3,585,069, 3,669,613, 4,220,500, 4,289,639, 4,310,435).

In practice, formaldehyde solutions have hitherto primarily been employed, water-insoluble trithiane and, as by-products, very unpleasant-smelling alkylmercaptans being formed [Review "$H_2S$-Scavenging" in Oil and Gas Journal, January 1989, 51-55 (Part 1); 81-82 (Part 2); February 1989, 45-48 (Part 3); 90-91 (Part 4)]. Trithiane is not stable. It decomposes easily into the starting materials. Using a scavenger based on formaldehyde, special safety precautions therefore have to be taken owing to the odor and the toxicity, both of hydrogen sulfide and of formaldehyde.

As a consequence of the disadvantages of formaldehyde described, other aldehydes or aldehyde mixtures are increasingly employed today. Glyoxal, in particular, has found its way into the oil and natural gas industry as a hydrogen sulfide scavenger. U.S. Pat. No. 4,680,127 describes a process for reducing the hydrogen sulfide content in aqueous or wet gaseous media by addition of exceedingly small amounts of glyoxal or glyoxal in combination with other aldehydes. However, an essential disadvantage of this process is that the addition products of glyoxal and hydrogen sulfide formed in this case are water soluble and only stable in the alkaline range (pH=9). In the acidic pH conditions prevailing in practice (pH=4.5-5.5), these addition products are no longer stable and decompose with the release of hydrogen sulfide.

A scavenger system, in particular for toxic substances, such as hydrogen sulfide, however, must in addition to the industrial feasibility also yield final products which are water-insoluble in the acidic and basic range, which can be handled without risk and, for reasons of environmental protection, must be disposable or reusable.

Surprisingly, it has now been found that on introducing gases containing hydrogen sulfide into an aqueous glyoxal solution having a pH of 5-11, a stable product which is insoluble in water and even in acids (pH 1) is formed if the glyoxal solution has a concentration of at least 15% by weight. U.S. Pat. No. 5,085,842, column 1, lines 37-68 and column 2, lines 1-28.

See U.S. Pat. No. 5,085,842 which describes and claims a process for scavenging hydrogen sulfide from gases, in which the hydrogen sulfide-containing gas is introduced into an aqueous glyoxal solution of at least 15% by weight strength at a pH of a solution of 5 to 11 until the molar ratio of glyoxal to hydrogen sulfide is 3 to 2. The solid reaction product obtained in this way, which contains the hydrogen sulfide in bound form, is separated off. Owing to its stability and insolubility in acids and bases, it can be disposed of without problems.

Glyoxal is an aldehyde. It can be applied in neutral, acidic, and alkaline conditions. Glyoxal does not increase scaling risk, but its reaction time is much slower than triazine.

Basolong® GL-40 is a glyoxal H2S scavenger offered for sale commercially by BASF. Its advantages include that its reaction efficiency with H2S is higher than that of triazine, when used it does not cause precipitation of calcium scale from glyoxal brine solutions. In addition is has exceptionally good high temperature stability with no decomposition until temperatures exceed 150° C. In addition, reaction with glyoxal does not cause the formation of formaldehyde as a by-product.

U.S. Pat. No. 5,980,845 "Regeneration of Hydrogen Sulfide Scavengers", issued on Nov. 9, 1999. This now expired US patent describes and claims sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

US 2013/004393 "Synergistic Method for Enhanced H2S/Mercaptan Scavenging", issued as U.S. Pat. No. 9,463,989 B2 on Oct. 11, 2016. This patent describes and claims the use of a dialdehyde (e.g. glyoxal) and a nitrogen-containing scavenger (e.g. a triazine) when injected separately in media containing hydrogen sulfide ($H_2S$) and/or mercaptans to scavenge $H_2S$ and/or mercaptans therefrom gives a synergistically better reaction rate and overall scavenging efficiency, i.e. capacity, over the use of the dialdehyde or the nitrogen-containing scavenger used alone, but in the same total amount of the dialdehyde and nitrogen-containing scavenger. The media may include an aqueous phase, a gas phase, a hydrocarbon phase and mixtures of a gas and/or hydrocarbon phase with an aqueous phase.

US 2018/291284 A1 "Microparticles For Capturing Mercaptans" published on Oct. 11, 2018, and is assigned to Ecolab. This now abandoned patent application describes and claims scavenging and antifouling nanoparticle compositions useful in applications relating to the production, transportation, storage, and separation of crude oil and natural gas, as well as oral hygiene. Also disclosed are methods of making the nanoparticle compositions as scavengers and antifoulants, particularly in applications relating to the production, transportation, storage, and separation of crude oil and natural gas, as well as oral hygiene.

SUMMARY OF THE INVENTION

The first aspect of the instant claimed invention is a process to remove $H_2S$ from a stream comprising the steps of:

a) Adding a fluid comprising glyoxal and one or more types of silica nanoparticles to a stream comprising H2S, b) wherein the stream is selected from the group consisting of Oil streams, Gas streams, $CO_2$ point source purification streams and Geothermal Energy System streams.

The second aspect of the instant claimed invention is the process of the first aspect of the instant claimed invention, wherein a triazine is also present in the fluid.

The third aspect of the instant claimed invention is the process of the first aspect of the instant claimed invention, wherein the silica nanoparticle is an aluminum oxide functional silica nanoparticle.

DETAILED DESCRIPTION OF THE INVENTION

Glyoxals useful in the instant claimed invention include, but are not limited to, glyoxals that are commercially available from BASF and other companies.

Glyoxals can be present in the process at a level of from about one (1) unit to about two (2) units per 3 units of H2S.

For purposes of this patent application, silica nanoparticles include silica nanoparticles, alumina nanoparticles and silica-alumina nanoparticles.

The silica nanoparticles are sourced from all forms of precipitated $SiO_2$ a) dry silica;

b) fumed silica;

c) colloidal silica;

d) surface treated silicas including silicas reacted with organosilanes;

e) metal or metal-oxide with silica combinations; and f) precipitated silica.

There are known ways to modify the surface of colloidal silica:

1. Covalent attachment of Inorganic oxides other than silica.

2. Non-covalent attachment of small molecule, oligomeric, or polymeric organic materials (PEG treatment, amines or polyamines, sulfides, etc.).

3. Covalent attachment of organic molecule including oligomeric and polymeric species:

a. Reaction with organosilanes/titanates/zirconates/germinates.

b. Formation of organosilanes/titanate/zirconate/germinate oligomers followed by reaction of these with surface of colloidal silica.

c. Silanization followed by post-reaction formation of oligomeric/dendritic/hyperbranched/polymeric species starting from colloidal silica surface.

d. Formation of oligomeric/dendritic/hyperbranched/polymeric silanes/zirconates/titanates followed by reaction to $SiO_2$ surface.

The silica particles included in the colloidal silica may have any suitable average diameter. As used herein, the average diameter of silica particles refers to the average largest cross-sectional dimension of the silica particle. In an embodiment, the silica particles may have an average diameter of between about 0.1 nm and about 100 nm. In an embodiment, the silica particles may have an average diameter of between about 1 nm and about 100 nm. In an embodiment, the silica particles may have an average diameter of between about 5 nm and about 100 nm. In an embodiment, the silica particles may have an average diameter of between about 1 nm and about 50 nm. In an embodiment, the silica particles may have an average diameter of between about 5 nm and about 50 nm. In an embodiment, the silica particles may have an average diameter of between about 1 nm and about 40 nm. In an embodiment, the silica particles may have an average diameter of between about 5 nm and about 40 nm. In an embodiment, the silica particles may have an average diameter of between about 1 nm and about 30 nm. In an embodiment, the silica particles may have an average diameter of between about 5 nm and about 30 nm. In an embodiment, the silica particles may have an average diameter of between about 7 nm and about 20 nm.

In an embodiment, the silica particles have an average diameter of less than or equal to about 30 nm. In another embodiment, the silica particles may have an average diameter of less than or equal to about 25 nm. In another embodiment, the silica particles may have an average diameter of less than or equal to about 20 nm. In another embodiment, the silica particles may have an average diameter of less than or equal to about 15 nm. In another embodiment, the silica particles may have an average diameter of less than or equal to about 10 nm. In another embodiment, the silica particles may have an average diameter of less than or equal to about 7 nm. In another embodiment, the silica particles may have an average diameter of at least about 5 nm. In another embodiment, the silica particles may have an average diameter of at least about 7 nm. In another embodiment, the silica particles may have an average diameter of at least about 10 nm. In another embodiment, the silica particles may have an average diameter of at least about 15 nm. In another embodiment, the silica particles may have an average diameter of at least about 20 nm. In another embodiment, the silica particles may have an average diameter of at least about 25 nm. Combinations of the above-referenced ranges are also possible.

Colloidal silica is a flexible technology medium, allowing for customized surface treatment based on application. In an embodiment, the silica is a GlycidoxyPropylTriMethoxySilane-functional silica. GPTMS-functionalized silica includes alkaline sol silica, available from Nissan Chemical America as ST-V3. Another GPTMS-functionalized silica is an acidic type of silica sol, available from Nissan Chemical America as ST-OV3.

The amount of silica nanoparticle used per unit of H2S is as follows:

In an embodiment, 1 unit of silica nanoparticle per 3 units of H2S, in another embodiment, 1 unit of silica nanoparticle per 5 units of H2S and in another embodiment, 1 unit of silica nanoparticle per 10 units of H2S.

The alumina nanoparticles are sourced from all forms of precipitated $Al_2O_3$ a) dry alumina;

b) fumed alumina;

c) colloidal alumina;

d) surface treated aluminas including aluminas reacted with organosilanes;

e) metal or metal-oxide with alumina combinations; and f) precipitated alumina.

There are known ways to modify the surface of colloidal alumina:

1. Covalent attachment of Inorganic oxides other than alumina.

2. Non-covalent attachment of small molecule, oligomeric, or polymeric organic materials (PEG treatment, amines or polyamines, sulfides, etc.).

3. Covalent attachment of organic molecule including oligomeric and polymeric species:

a. Reaction with organosilanes/titanates/zirconates/germinates.

b. Formation of organosilanes/titanate/zirconate/germinate oligomers followed by reaction of these with surface of colloidal alumina.

c. Silanization followed by post-reaction formation of oligomeric/dendritic/hyperbranched/polymeric species starting from colloidal alumina surface.

d. Formation of oligomeric/dendritic/hyperbranched/polymeric silanes/zirconates/titanates followed by reaction to $Al_2O_3$ surface.

The alumina particles included in the colloidal alumina may have any suitable average diameter. As used herein, the average diameter of alumina particles refers to the average largest cross-sectional dimension of the alumina particle. In an embodiment, the alumina particles may have an average diameter of between about 0.1 nm and about 100 nm. In another embodiment, the alumina particles may have an average diameter of between about 1 nm and about 100 nm. In another embodiment, the alumina particles may have an average diameter of between about 5 nm and about 100 nm. In another embodiment, the alumina particles may have an average diameter of between about 1 nm and about 50 nm. In another embodiment, the alumina particles may have an average diameter of between about 5 nm and about 50 nm. In another embodiment, the alumina particles may have an average diameter of between about 1 nm and about 40 nm. In another embodiment, the alumina particles may have an average diameter of between about 5 nm and about 40 nm. In another embodiment, the alumina particles may have an average diameter of between about 1 nm and about 30 nm. In another embodiment, the alumina particles may have an average diameter of between about 5 nm and about 30 nm. In another embodiment, the alumina particles may have an average diameter of between about 7 nm and about 20 nm.

In an embodiment, the alumina particles have an average diameter of less than or equal to about 30 nm. In an embodiment, the alumina particles have an average diameter of less than or equal to about 25 nm. In an embodiment, the alumina particles have an average diameter of less than or equal to about 20 nm. In an embodiment, the alumina particles have an average diameter of less than or equal to about 15 nm. In an embodiment, the alumina particles have an average diameter of less than or equal to about 10 nm. In an embodiment, the alumina particles have an average diameter of less than or equal to about 7 nm. In an embodiment, the alumina particles have an average diameter of at least about 5 nm. In an embodiment, the alumina particles have an average diameter of at least about 7 nm. In an embodiment, the alumina particles have an average diameter of at least about 10 nm. In an embodiment, the alumina particles have an average diameter of at least about 15 nm. In an embodiment, the alumina particles have an average diameter of at least about 20 nm. In an embodiment, the alumina particles have an average diameter of at least about 25 nm. Combinations of the above-referenced ranges are also possible.

Colloidal alumina is a flexible technology medium, allowing for customized surface treatment based on application. In an embodiment, the alumina is a GPTMS-functional alumina. GlycidoxyPropylTriMethoxySilane-functional alumina includes alkaline sol silica, available from Nissan Chemical America as AT-V6. Another GPTMS-functionalized alumina is an acidic type of silica sol, available from Nissan Chemical America as AT-OV6.

The amount of alumina nanoparticle used per unit of H2S is as follows:

1 unit of alumina nanoparticle per 3 units of H2S, in another embodiment, 1 unit of alumina nanoparticle per 5 units of H2S and in another embodiment, 1 unit of alumina nanoparticle per 10 units of H2S.

Some examples of nanoparticles can include particles of spherical shape, fused particles such as fused silica or alumina or particles grown in an autoclave to form a raspberry style morphology, or elongated silica particles. The particles being bare, or surface treated. When surface treated may be polar or non-polar.

The surface treatment is sufficient to allow the nanoparticle to be stable during transportation to the area where a $H_2S$ sorbent is required and for delivery. The stability achieved either by covalent, charge-charge, dipole-dipole, or charge-dipole interactions.

Triazines useful in the instant claimed invention include, but are not limited to, 1,2,3-triazine; 1,2,4-triazine and 1,3,5-triazine (aka s-triazine). Triazines useful in the instant claimed invention include Hexahydro-1,3,5-tris(hydroxyethyl)-s-triazine.

Triazines are alkaline and can cause carbonate scaling. Triazines are commercially available.

Triazines can be present in the process at a level of from about zero point 1 (0.1) units to about 1 unit per 3 units of H2S. Units could mean any quantitative measure, such as grams, pounds, mols, etc. etc.

$CO_2$ Point Source Purification is described in "Evaluation of $CO_2$ Purification Requirements and the Selection of Processes for Impurities Deep Removal from the $CO_2$ Product Stream", Zeina Abbas et al, Energy Procedia, Volume 37, 2013, Pages 2389-2396. Depending on the reference power plant, the type of fuel and the capture method used, the $CO_2$ product stream contains several impurities which may have a negative impact on pipeline transportation, geological storage and/or Enhanced Oil Recovery (EOR) applications. All negative impacts require setting stringent quality standards for each application and purifying the $CO_2$ stream prior to exposing it to any of these applications.

In the Abbas paper, the $CO_2$ stream specifications and impurities from the conventional post-combustion capture technology are assessed. Furthermore, the $CO_2$ restricted purification requirements for pipeline transportation, EOR and geological storage are evaluated. Upon the comparison of the levels of impurities present in the $CO_2$ stream and their restricted targets, it was found that the two major impurities which entail deep removal, due to operational concerns, are oxygen and water from 300 ppmv to 10 ppmv and 7.3% to 50 ppmv respectively. Moreover, a list of plausible technologies for oxygen and water removal is explored after which the selection of the most promising technologies is made. It was found that catalytic oxidation of hydrogen and refrigeration and condensation are the most promising technologies for oxygen and water removal respectively.

"Geothermal Energy System Streams" are described as follows:

Hot water is pumped from deep underground through a well under high pressure.

When the water reaches the surface, the pressure is dropped, which causes the water to turn into steam.

The steam spins a turbine, which is connected to a generator that produces electricity.

The steam cools off in a cooling tower and condenses back to water.

EXAMPLES

Materials:

Stepanquat 200 is a 78.5% actives solution of Hexahydro-1,3,5-tris(hydroxyethyl)-s-triazine available commercially from Stepan Corp.

ST-040, ST-30, ST-OV4, PGM-ST, ST-C, ST-V3, and MT-ST are commercially available colloidal silica products from Nissan Chemical America Corporation.

Organosilanes, Propylene Glycol Monomethyl Ether solvent, $NaHCO_3$, $CuCl_2$—$H_2O$, and Glyoxal were procured from Sigma Aldrich Corp.

Synthesis Example 1

1000 mL Snowtex® ST-30 from Nissan Chemical America Corporation (Aqueous alkaline colloidal silica dispersion, 30 wt % $SiO_2$ solids, 10-15 median particle size) was placed into a 2000 mL 4 neck glass reactor assembled with addition funnel, thermometer, heating mantle connected to voltage regulator, and mixer with 2 inch diameter trifoil mixing blade. Mixing was activated at 150 rpm and silicasol was brought to 50° C. Into the addition funnel was weighed 49.98 g of Aminoethylaminoethylaminopropyl Trimethoxysilane (CAS #35141-30-1, Sigma-Aldrich). Addition funnel was assembled to reactor top and silane was slowly added to stirring silicasol at a drop rate of 2 drops per second. After all organosilane had been added to reaction the mixture was allowed to stir at 50° C. for a period of 3 hours. Finished surface-treated alkaline silica was poured off to a 2 L Nalgene bottle for storage and use.

Synthesis Example 2

1.4 L Snowtex® O-XS (Aqueous acidic colloidal silica dispersion, 10 wt % colloidal silica median particle size 5 nm) was transferred to a 4-neck reaction kettle. To this vessel were also added 9.6 L distilled water. Copper (II) Chloride dehydrate ($CuCl_2$—$H_2O$, Sigma Aldrich), 13.87 g were added to the reaction flask and allowed to dissolve at room temperature under light agitation. A stock solution ("Solution A") of $NaHCO_3$(Sigma Aldrich ACS reagent grade, >99.7% was prepared (47.04 g $NaHCO_3$ dissolved in 12.6 L distilled water, 0.04 M final concentration). The stir rate in the reaction vessel was increased to 9500 rpm to achieve vigorous agitation. Solution A was added slowly 10-15 mL per minute to the reaction via addition funnel. After Solution A was added completely the reaction was allowed to stir at room temperature for 30 minutes and contents were removed for storage and use.

Synthesis Example 3

Snowtex® PGM-ST (Solvent borne dispersion of acidic colloidal silica, 30 wt % $SiO_2$ median particle size 10-15 nm dispersed in Propylene Glycol Monomethyl ether), 450 g were placed into a 1000 mL 4-neck reaction flask. Similar to Synthesis Example 1 the reactor was assembled with mixer, thermometer, and heating mantle/voltage regulator. A 4.05 g portion of 3-Mercaptopropyl Trimethoxysilane (Sigma Aldrich) were added to an addition funnel and assembled to the reactor. PGM-ST was brought to 50° C. under mild agitation and Mercaptopropyl trimethoxysilane was added dropwise via addition funnel at 1 drop/second until addition was complete. Reaction was kept at 50° C. for a period of 3 hours, then the surface-treated silicasol was poured off to a Nalgene container for storage and use.

Example 1, Comparative

Into a 1000 mL Nalgene bottle were placed 300 g distilled $H_2O$, 300 g Propylene Glycol Monomethyl Ether ("PGM") solvent, and 300 g Stepanquat 200. Contents were mixed thoroughly by shaking container vigorously for 30 seconds.

Example 2

Into a 1000 mL Nalgene bottle were placed 300 g distilled $H_2O$, 300 g Propylene Glycol Monomethyl Ether solvent, and 300 g Synthesis Example 1 fluid. Contents were mixed thoroughly by shaking container vigorously for 30 seconds.

Example 3, Comparative

Into a 1000 mL Nalgene bottle were placed 700 g distilled $H_2O$, and 300 g Stepanquat 200. Contents were mixed thoroughly by shaking container vigorously for 30 seconds.

Example 4

Into a 1000 mL Nalgene bottle were placed 300 g distilled $H_2O$, 300 g ST-040 (Aqueous acidic colloidal silica available from Nissan Chemical America Corporation), and 300 g Stepanquat 200. Contents were mixed thoroughly by shaking container vigorously for 30 seconds.

Example 5

Into a 1000 mL Nalgene bottle were placed 300 g distilled $H_2O$, 300 g Synthesis Example 2 fluid, and 300 g Stepanquat 200. Contents were mixed thoroughly by shaking container vigorously for 30 seconds.

Example 6

Into a 1000 mL Nalgene bottle were placed 300 g distilled $H_2O$, 300 g ST-OV4 (Aqueous acidic hydrophilic surface treated colloidal silica available from Nissan Chemical America Corporation), and 300 g Stepanquat 200. Contents were mixed thoroughly by shaking container vigorously for 30 seconds.

Example 7

Into a 1000 mL Nalgene bottle were placed 300 g distilled $H_2O$, 300 g Synthesis Example 3 fluid, and 300 g Stepanquat 200. Contents were mixed thoroughly by shaking container vigorously for 30 seconds.

Example 8

Into a 1000 mL Nalgene bottle were placed 375 g aqueous solution of Glyoxal (Sigma Aldrich, 37.5 wt %) and 625 g ST-C (Aqueous alkaline colloidal silica dispersion partially surface treated with Aluminum Oxide available from Nissan Chemical America Corporation). Contents were mixed thoroughly by shaking container vigorously for 30 seconds.

Example 9

Into a 1000 mL Nalgene bottle were placed 375 g aqueous solution of Glyoxal (Sigma Aldrich, 37.5 wt %) and 625 g ST-O40 (Aqueous acidic colloidal silica dispersion available from Nissan Chemical America Corporation). Contents were mixed thoroughly by shaking container vigorously for 30 seconds.

Example 10

Into a 1000 mL Nalgene bottle were placed 375 g aqueous solution of Glyoxal (Sigma Aldrich, 37.5 wt %) and 625 g ST-V3 (Aqueous alkaline hydrophilic surface treated colloidal silica dispersion available from Nissan Chemical America Corporation). Contents were mixed thoroughly by shaking container vigorously for 30 seconds.

Example 11

Into a 1000 mL Nalgene bottle were placed 375 g aqueous solution of Glyoxal (Sigma Aldrich, 37.5 wt %) and MT-ST (Solvent borne acidic colloidal silica dispersed in Methanol, 30 wt % $SiO_2$, 10-15 nm median particle size, available from Nissan Chemical America Corporation). Contents were mixed thoroughly by shaking container vigorously for 30 seconds.

Example 12: Comparative

Into a 1000 mL Nalgene bottle were placed 375 g aqueous solution of Glyoxal (Sigma Aldrich, 37.5 wt %) and 625 g distilled $H_2O$. Contents were mixed thoroughly by shaking container vigorously for 30 seconds.

MEA Triazine was kept at a constant concentration across all the Inventive and Comparative examples. Similarly, Glyoxal concentration was kept constant across all Inventive and Comparative examples.

Testing for Removal of H2S

Each solution tested was equilibrated for weight at 300 g total solution and placed into a vessel with overhead port to measure H2S content in the vessel headspace. The headspace port was connected to a Drager Pac® 3500 gas monitor (Dragerwerk AG&Co. KGaA). A mixed gas of 10% $H_2S$/90% Nitrogen was bubbled through the test solution at a standard rate of 475 mL/minute, solution held at 22° C., and headspace monitored for $H_2S$ content. A reading of 0 means the sensor is not detecting any $H_2S$ in the flow gas stream after the gas has passed through the tested solution. Vessel headspace was monitored for $H_2S$ content once per minute continuously until a $H_2S$ content of 40 reading on gas monitor was reached, at which point the test example in solution reacting with $H_2S$ was considered to be consumed and the experiment stopped. Times to initial $H_2S$ reading and Time to complete $H_2S$ breakthrough were recorded and compared to controls/comparative examples.

Summary of Results

The Number of minutes is listed is how long the detector detected a value of "0" for H2S. The Table is ordered from best performance in terms of removal of H2S to worst performance.

| Example | Time to initial H2S reading (minutes) | Time to 40% H2S reading (minutes) | Composition | nanoparticle type |
|---|---|---|---|---|
| 2 | 124 | 160 | Triazine + Water + Amine func. SiO2 | Amine-Functional SiO2 |
| 1 | 117 | 145 | Triazine + Water + PGMsolvent (Comparative Example) | none |
| 8 | 107 | 184 | Glyoxal + ST-C | Aluminum oxide functional SiO2 |
| 4 | 71 | 164 | Triazine + Water + ST-O40 | Aqueous acidic SiO2 |
| 10 | 55 | 146 | Glyoxal + ST-V3 | Glycidoxy functional SiO2, alkaline |
| 5 | 55 | 139 | Triazine + Water + CuOXS | Transition Metal functional SiO2 |
| 7 | 55 | 105 | Triazine + Water + Mercapto functionalized PGM-ST | Mercapto Functional SiO2 |
| 9 | 51 | 86 | Glyoxal + ST-O40 | Aqueous acidic SiO2 |
| 3 | 44 | 61 | Triazine + Water (Comparative Example) | none |
| 6 | 39 | 153 | Triazine + Water + ST-OV4 | Glycidoxy functional SiO2, acidic |
| 12 | 8 | 14 | Glyoxal + Water (Comparative Example) | none |
| 11 | 1 | 2 | Glyoxal + MT-ST | Solventborne SiO2, acidic |

Observations about the Examples

1. Example 1: This is a Triazine controls/comparative examples with MEA Triazine dissolved in a mixture of water and PGM solvent. This example performed very well, much better than MEA Triazine alone at the same concentration dissolved in water. It is believed, without intending to be bound there bye, that it is possible PGM is actually very beneficial in Triazine+H2S reaction.
2. Example 2 (Amine-functional $SiO_2$ combined with Triazine) performed very well compared to the comparative example, with improved/delayed time to initial H2S breakthrough and also time to final breakthrough (when the H2S readings reached a 40% level in the headspace above the sample).
3. Example 3 is the Triazine+water control, these times were used comparatively for all the Triazine+nanosilica examples. Example 3 exemplifies the standard field grade fluid of MEA Triazine fluid for treatment of sour gas.
4. Example 4 (ST-040, Aqueous acidic silica+Triazine) performed the best of all Triazine+nanosilica examples.

It is believed, without intending to be bound thereby, that the solid acidity of the acidic silica surface is likely acting as a catalyst to make the Triazine+H2S reaction more complete, leading to greatly improved/delayed time to initial and complete H2S breakthrough.

5. Example 5 (Copper functionalized nanosilica+Triazine) performed relatively well in improved/delayed time to initial and complete H2S breakthrough. This example is the only example of Transition Metal functional silica. (It is noted that the Aluminum present in Example 8 is not considered a true Transition metal, as it is a "Post Transition Metal".)

6. Example 6 (ST-OV4+Triazine) is aqueous acidic silica functionalized with hydrophilic organic surface treatment and is commercially available from Nissan Chemical America. This example had slightly worse time to H2S initial breakthrough, but had a greatly improved time to complete H2S breakthrough compared to the control (Example 3).

7. Example 7 (Mercapto-functional nanosilica dispersed in PGM+Triazine)—Slightly improved time to initial H2S breakthrough and much improved time to complete H2S breakthrough. It is believed, without intending to be bound thereby, that the Mercapto surface functionality can disrupt polymer formation in the Triazine+H2S reaction.

8. Example 8 is ST-C (Aqueous alkaline colloidal silica with Aluminum Oxide surface) combined with Glyoxal. Compared to Glyoxal alone this combination of ST-C+Glyoxal showed dramatic improvements in both time to initial and time to complete H2S breakthrough. The Glyoxal+nanosilica examples performed relatively well. It is noted that the Aluminum present in Ex. 8 is not considered a true Transition metal, as it is a "Post Transition Metal".

9. Example 9 (ST-040+Glyoxal) performed much better than Glyoxal alone.

10. Example 10 (ST-V3, Aqueous alkaline silica with hydrophilic organic surface treatment+Glyoxal) performed very well compared to Glyoxal alone.

11. Example 11 (Acidic silica dispersed in Methanol) did not perform well, this example had the worst results of all. It is believed, without intending to be bound thereby that MT-ST completely deactivated Glyoxal from reacting with H2SJ 12. Example 12 is the solution of Glyoxal and water only, a comparative example with no added nanotechnology.

The invention claimed is:

1. A process to remove $H_2S$ from a stream comprising the steps of:
   a) Adding a fluid consisting of an aqueous solution of glyoxal and one or more types of silica nanoparticles, optionally a triazine, to a stream comprising $H_2S$,
      wherein the stream is selected from the group consisting of Oil streams, Gas streams, $CO_2$ point source purification streams and Geothermal Energy System streams.

2. The process of claim 1, wherein the triazine is present in the fluid.

3. The process of claim 1, wherein the silica nanoparticle is an aluminum oxide functional silica nanoparticle.

4. A process to remove $H_2S$ from a stream comprising the step of:
   a) Adding a fluid comprising glyoxal and one or more types of silica nanoparticles to a stream comprising $H_2S$,
   wherein the stream is selected from the group consisting of Oil streams, Gas streams, $CO_2$ point source purification streams and Geothermal Energy System streams, and
   wherein the one or more types of silica nanoparticles are selected from the group consisting of aluminum oxide functionalized silica nanoparticles, aqueous acidic colloidal silica dispersion, and aqueous alkaline hydrophilic surface treated colloidal silica dispersion.

5. The process of claim 4, wherein the one or more types of silica nanoparticles are aqueous alkaline colloidal silica dispersion partially surface treated with aluminum oxide.

6. The process of claim 4, wherein the one or more types of silica nanoparticles are aqueous acidic colloidal silica dispersion.

7. The process of claim 4, wherein the one or more types of silica nanoparticles are aqueous alkaline glycidoxy surface treated colloidal silica.

* * * * *